Oct. 18, 1960                R. T. BURGESS                2,956,843
THERMALLY ACTUATED LOAD RELIEVING DEVICE
Filed April 21, 1958
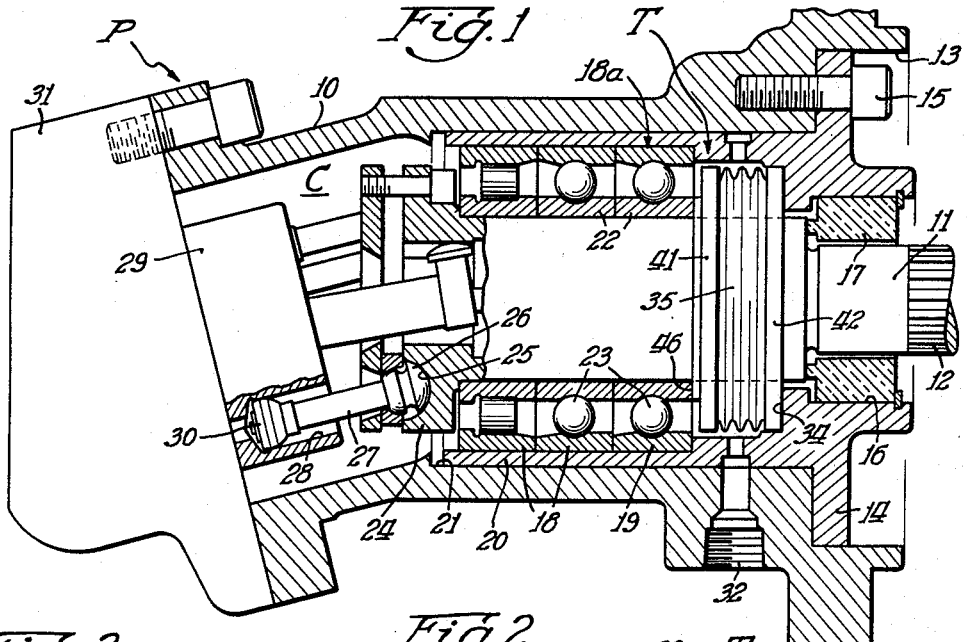
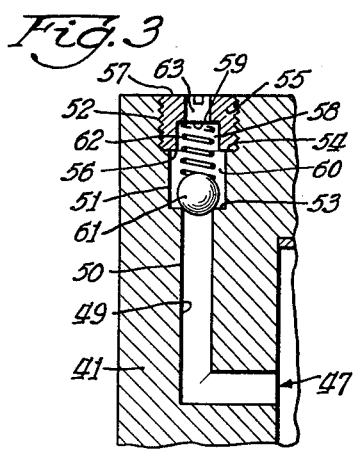
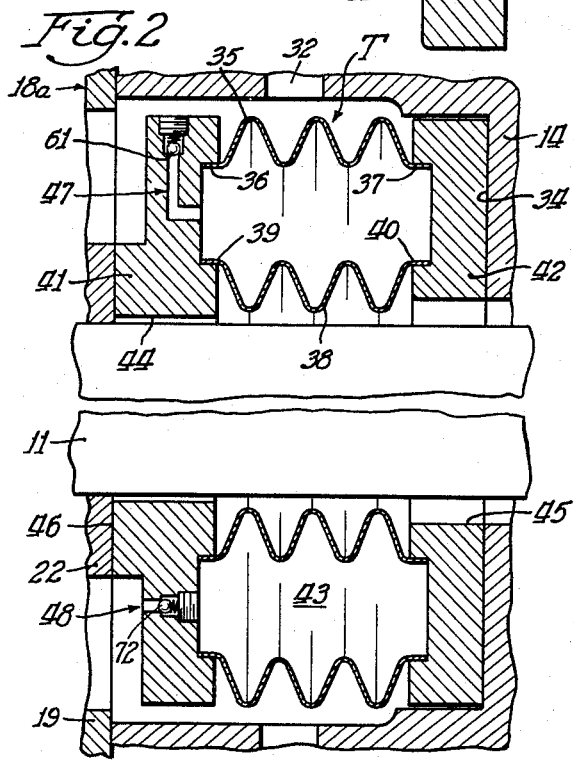
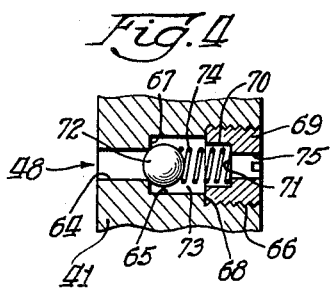
Inventor:
Roy T. Burgess
By: Frank C. Parker, Atty.

United States Patent Office 2,956,843
Patented Oct. 18, 1960

---

2,956,843

THERMALLY ACTUATED LOAD RELIEVING DEVICE

Roy T. Burgess, Cleveland, Ohio, assignor to Borg-Warner Corporation, Chicago, Ill., a corporation of Illinois Filed Apr. 21, 1958, Ser. No. 729,946

7 Claims. (Cl. 308—219)

This invention relates to a temperature responsive device, and, in particular, to a thermal load balancing device that is adapted to exert a force against a load element in relation to the heat generated by the load element in response to thrust loads exerted thereagainst, the force tending to oppose the thrust loads and thus reduce the effects thereof.

Heretofore, it has been necessary to specially construct and design thrust load elements, such as bearings, which are adapted to be subject to high thrust loads exerted thereagainst in order for the load elements to withstand the effects of the thrust loads without subsequent failure thereof. There are, of course, many different types of applications for thrust load elements. One application for thrust load elements exists, for example, in piston-type hydraulic pumps where the rotating drive shaft is supported within the pump housing by a plurality of thrust load bearings. The reciprocating pistons of the pump, during the respective discharge strokes thereof, exert thrust loads or forces against the rotating drive shaft which, in turn, exerts the thrust loads or thrust forces against the bearings at a predetermined angular direction relative to the rotational axis of the drive shaft. The greater the thrust forces imposed against the bearings, the greater the tendency of the bearings to generate heat through increased frictional contact between the rotating and stationary parts thereof. It is well known that the generation of heat by the bearings causes subsequent deterioration of the bearings unless some means are provided to dissipate the heat. Normally, a coolant medium is circulated about the bearings in order to dissipate the heat generated thereby. This coolant medium sometimes comprises a portion of the hydraulic fluid which is subsequently to be pumped by the pumping apparatus.

It has been found, however, that in pump structures of the above described type and in other applications thereof, the effect of the circulating coolant medium is sometimes not sufficient to completely dissipate the heat in order to lower the temperature of the load elements or bearings below the critical temperature range which results in relatively rapid deterioration of the load elements. To overcome this factor the bearings must be designed to withstand excessive thrust loads. To accomplish this, a larger sized thrust bearing is designed, the size thereof being relatively greater than the size that is desired for the application thereof. This causes a re-designing of the equipment utilizing the over-sized bearing, thereby not only increasing the relative cost of the bearings but also the cost and relative weight of the apparatus. Further, in some applications of the equipment it is imperative that size and weight be held at a minimum. Therefore, it is desirable to provide some means for preventing failure of bearings or other load elements, which can withstand normal thrust forces but not the excessive thrust forces, without increasing the size thereof.

This invention, therefore, has as one of its objects to provide a device which is responsive to thrust loads or forces imposed against a thrust load element and which will tend to relieve the effect of the thrust forces exerted against the load element.

It is another object of this invention to provide a temperature responsive device comprising a member which is adapted to be expanded and collapsed in only an axial direction in response to the temperature thereof.

A further object of this invention is to provide a temperature responsive device comprising a member having axially spaced opposed ends whereby the member is adapted to be expanded and collapsed in only said axial direction to thereby dispose the opposed ends in different spaced relations, the member being provided with a cavity therein filled with a temperature responsive medium, whereby the medium in response to the temperature thereof causes the expansion and collapsing of the device.

Another object of this invention is to provide a temperature responsive device which is adapted to exert forces against a load element in response to the temperature of the load element, the temperature of the load element being in relation to the thrust forces exerted thereagainst in a direction substantially opposite to the direction of the forces exerted by the temperature responsive element whereby the effect of the thrust forces exerted against the load element is reduced.

Other and more particular objects, advantages, and uses of this invention will become apparent from a reading of the following specification taken in connection with the accompanying drawing forming a part thereof, and wherein:

Figure 1 illustrates, in axial cross section, a hydraulic piston-type pump incorporating a temperature responsive device formed in accordance with the teachings of this invention.

Figure 2 illustrates, in axial cross section, one form of a temperature responsive device formed in accordance with the teachings of this invention.

Figures 3 and 4 illustrate, in enlarged fragmentary views, details of one-way valves incorporated in the temperature responsive device illustrated in Figure 2.

Reference is made to the accompanying drawing wherein like reference numerals are used in the figures thereof to designate like parts, and particular reference is made to Figure 1 wherein the reference numeral 10 indicates a stationary hollow housing of a typical piston-type hydraulic pump P. The pump P is merely shown to illustrate one typical application for a temperature responsive device, generally indicated at T, made in accordance with the teachings of this invention. It should be understood that there are many different types of applications for this invention and that this invention is not limited to this particular pump application. The pump P illustrated in Figure 1 is a type pump that is common in the field. This basic type pump is fully disclosed in the patent to Boyd, No. 2,404,616, and, therefore, need not be fully described.

The pump P includes a rotatable drive shaft 11 journalled within the hollow pump housing 10. The drive shaft 11 is adapted to have an externally splined end portion 12 thereof extending beyond an opened end 13 of the housing 10 in order to provide a suitable coupling means for connecting a driving means (not shown) to the drive shaft 11 for rotating the same. An end plate 14 is suitably fastened by a plurality of bolts 15 to the opened end 13 of the housing 10. The end plate 14 is provided with a substantially circular aperture 16 therein adapted to concentrically encompass the drive shaft 11. The end plate 14 is provided with a suitable shaft seal 17 disposed between the outer periphery of the drive shaft 11 and the inner periphery of the end plate 14, the inner periphery of the end plate 14 being defined by the aperture 16. The seal 17 permits the drive shaft 11 to be rotatable relative to the end plate 14 and prevents fluid from leaking from within the housing 10 through the aperture 16 of the end plate 14 to the exterior of the pump P.

The drive shaft 11 is rotatably supported within the hollow housing 10 by a plurality of thrust bearings 18 of a well known design. The bearings 18 each comprise an outer race 19 disposed in non-rotatable engagement with a sleeve 20 formed substantially integrally with the inner peripheral surface 21 of the housing 10. Each bearing 18 is also provided with an inner race 22 telescopically disposed about the drive shaft 11 and in rotatable engagement therewith. A plurality of rolling elements 23 are disposed between the outer race 18 and the inner race 22 of each bearing 18, thus permitting the inner races 22 to be rotated by the drive shaft 11 relative to the stationary outer races 19.

The drive shaft 11 is provided with an enlarged end portion 24 which is provided with a plurality of circumferentially disposed bearing sockets 25. Each socket 25 is adapted to receive one end 26 of a pumping piston 27.

In the normal operation of a pump of the type illustrated in Figure 1, the drive shaft 11 is rotated on its axis by a suitable driving means (not shown) drivingly connected to the splined end portion 12 thereof. The rotation of the drive shaft 11 causes the pistons 27 to be rotated about the axis of the drive shaft 11. As the pistons 27 are carried about the axis of the drive shaft 11, they are each caused to reciprocate within a respective cylinder 28 formed in rotatable cylinder housing 29 disposed on an axis which is angular to the axis of rotation of the drive shaft 11. As forward or working ends 30 of the pistons 27 are withdrawn from the respective cylinders 28 due to the disposition of the cylinder housing 29 relative to the drive shaft 11, the cylinders 28 are adapted to be filled with fluid to be pumped in the manner of a normal intake stroke. Subsequently, the forward end 30 of each piston end 27 is projected into the cylinders 28 to affect the discharge of the hydraulic fluid contained therein in the manner of a normal discharge stroke thereof. Of course there is a predetermined sequence of operation of the pistons 27, as one may be in its full discharge position while the others are in various stages of their discharge or intake strokes. During the discharge strokes, the pistons 27 exert hydraulic thrust loads or load forces against the drive shaft 11 tending to move the drive shaft substantially to the right, as viewed in the drawing. Therefore, each piston 27, because of the hydraulic loading thereof during its discharge stroke, imposes load forces against the drive shaft in one direction. These load forces are subsequently transmitted angularly against the bearings 18 by the drive shaft 11. It can be seen that the inner and outer races, 22 and 19 respectively, of the bearings 18 are particularly designed to compensate for the angular load forces.

As previously stated, the thrust loads imposed against the bearings 18 tend to cause the inner and outer races, 22 and 19 respectively, of each bearing 18 to be compressed together thereby causing the races 22 and 19 to be in increased engagement with the rolling elements 23 disposed therebetween than that which exists normally. The greater the thrust forces imposed on each bearing 18, the greater the tendency for the rolling elements 23 and the races 19 and 22 to generate heat through the increased frictional condition thereof. Therefore the temperature of the bearings 18 increases in value in relation to the thrust or load forces exerted thereagainst.

A chamber C is provided within the housing 10 and is defined by the internal peripheral surface 21 of the housing 10, end plate 14, and another end plate 31 disposed at the left end of the housing 10. The chamber C is adapted to be interconnected by suitable means (not shown) with the inlet of the pump P. In this manner the fluid to be pumped by the pump P enters and fills the chamber C prior to entering the cylinders 28. A portion of this fluid is adapted to be circulated throughout the chamber C and over the bearings 18 and thus act as a coolant medium in dissipating the heat generated thereby. If desired, the fluid circulated over the bearings 18 may be bypassed back to the source of supply through a return port 32 formed in the housing 10 and interconnected with the chamber C and the source of supply (not shown).

As shown in Figure 2, the temperature responsive device T comprises an outer hollow flexible metal bellows 35 having spaced opposed opened ends 36 and 37. Another smaller hollow flexible metal bellows 38 having spaced opposed opened ends 39 and 40 is concentrically disposed within the bellows 35. A pair of end plates 41 and 42 are suitably fastened respectively to the open ends 36—39 and 37—40 of the bellows 35 and 38. The end plates 41 and 42 together with the bellows 35 and 38 define an annular chamber 43 within the device T, the bellows 35 and 38 tending to maintain the end plates 41 and 42 in a predetermined spaced relation and thus tending to maintain a predetermined capacity of the chamber 43. The end plates 41 and 42 are respectively formed with a centrally disposed aperture 44 and 45 therein, the apertures 44 and 45 being coaxially disposed with respect to each other and together with the inside peripheral surface of the bellows 38 provide a means for permitting the temperature responsive device T to be telescopically disposed about the drive shaft 11.

The forward face 46 of the end plate 41 may be provided with a low friction material surface, either formed integrally therewith or formed separately and suitably fastened thereto. The purpose for this low friction surface 46 will be later described.

The end plate 41 is formed with a pair of passage means 47 and 48, each passage means 47 and 48 being adapted to interconnect the chamber or cavity 43 of the temperature responsive device T with the exterior of the end plate 41.

The passage means 47 (see Figure 3) comprises an axially disposed bore interconnected with the chamber 43 at one end thereof and interconnected with a radially disposed passage means 49 at the other end thereof. The passage means 49 is formed in three concentric interconnected sections 50, 51 and 52. In this manner a shoulder 53 is formed at the juncture of section 50 with section 51, the shoulder 53 being utilized as a valve seat. A shoulder 54 is formed at the juncture of section 51 with section 52. The section 52 is formed with internal threads adapted to cooperate with external threads formed on a plug member 55 whereby the plug 55 is adapted to be telescopically disposed within the section 52. The plug 55, having opposed end surfaces 56 and 57, is provided with a centrally disposed bore 58 interrupting the end surface 56 and terminating within the member 55 to form a wall 59. When the plug 55 is telescopically disposed within the section 52 of the passage means 47, the front end surface 56 thereof is adapted to abut the shoulder 54. The bore 58 of the plug 55 together with the section 51 is adapted to define a chamber 60. A ball check valve 61 is disposed within the chamber 60 and is biased to a closed position against the valve seat 53 by a spring means 62 having one end thereof engaging the ball valve 61 and the other end thereof engaging the end wall 59 of the plug 55.

The plug 55 is provided with a centrally disposed passage 63 interconnecting the chamber 60 with the exterior of the plug 55. The plug 55 is also provided with a slot in the end surface 57 thereof whereby the plug 55 may be rotated by a suitable tool and thereby be moved axially relative to the end plate 41 in order to set a desired predetermined compression force of the spring means 62 tending to urge the ball valve 61 into sealing engagement with its valve seat 53.

The passage means 48 may be formed in substantially the same manner as passage means 47 if desired. However, as disclosed in Figure 4, the passage means 48 interconnects the chamber 43 with the exterior of the end plate 41 and comprises three interconnected, concentrically disposed sections 64, 65 and 66. A shoulder or valve seat 67 is formed at the juncture of the section 64 with the section 65, and, similarly, the section 65 defines a shoulder 68 at the juncture thereof with the section 66. A plug member 69, similar to plug member 55, is threadedly disposed within the section 66 and is formed with a bore 70 therein which terminates within the plug 68 forming an end wall 71. A ball check valve 72 is disposed within a chamber 73, the chamber 73 being defined by the bore 70 of the plug 69 and the section 65 of the passage means 48. The ball valve 72 is urged to its closed position in sealing engagement against the valve seat 67 by a spring means 74 disposed between the ball valve 72 and the end wall 71 of the plug 69. The plug 69 is provided with a passage 75 interconnecting the chamber 73 with the chamber 43 of the temperature responsive device T. The compression force of the spring means 74 urging the ball valve 72 to its closed position may be adjusted to any predetermined force by axially adjusting the plug 69 relative to the end plate 41 in a manner similar to the plug 55.

It should be noted that the ball check valve 61 is a one-way valve and is normally biased to prevent flow from the chamber 43 to the exterior of the device T, and that the ball check valve 72 is a one-way valve and is normally biased to prevent flow from the exterior of the device T to the chamber 43. It is to be understood that any form of passage means and valve means may be provided for the temperature responsive device T, the feature being deemed important and essential to this invention is to provide one-way means for permitting flow from the chamber 43 under certain other conditions.

The bellows 35 and 38 are so constructed and arranged that they tend to maintain the end plates in a predetermined spaced relation thereby providing a predetermined capacity for the chamber or cavity 43 therein. Further, the bellows 35 and 38 are only adapted to be expanded and collapsed in the axial direction thereof whereby the expansion and collapsing of the bellows 35 and 38 causes the end plates 41 and 42 to be in different spaced relations and thus correspondingly increase and decrease the capacity of the chamber 43.

The chamber 43 of the pressure responsive device T is filled with a predetermined amount of coolant medium through the passage means 48. The coolant medium may be the same type hydraulic fluid which is to be pumped by the pump P.

The temperature responsive device T is telescopically disposed about the drive shaft 11 within the space provided between the bearing 18a and the inside wall 34 of the end plate 14, the low frictional surface 46 of the end plate 41 engaging the inner rotatable race 22 of the bearing 18a and the end plate 42 thereof engaging the stationary inside wall 34 of the end plate 14. It can be seen that the low frictional surface 46 of the end plate 41 is stationary with respect to the rotatable race 22 of bearing 18a and in engagement therewith. However, the friction between these two parts is held to a minimum by the low frictional surface 46 and thus reduces the tendency of these two parts to generate heat.

The operation of the temperature responsive device T in the particular pump application illustrated in Figure 1 will now be described. It is to be understood that the device T will also perform in substantially the same manner in many other different types of applications and, therefore, it is not intended that the device T be limited to only pump applications.

The drive shaft 11 is rotated causing the pistons 27 to reciprocate within their respective cylinders 28 in order to pump the hydraulic fluid supplied to the chamber C to the discharge outlet (not shown) of the pump P. In the normal manner, the hydraulic thrust loads imposed against the drive shaft 11 during the respective discharge strokes of the pistons 27 are imparted thereby against the inner races 22 of the thrust bearings 18 causing the bearings 18 to generate heat through the increased frictional condition thereof. The hydraulic fluid within the chamber C circulates about the thrust bearings 18 absorbing the heat generated thereby. This circulating hydraulic fluid subsequently increases in temperature and passes about the temperature responsive device T causing an increase in the temperature of the predetermined amount of the coolant medium within the chamber 43 thereof. The heated coolant medium within the chamber 43 of the temperature responsive device T expands in volume in relation to the increased temperature thereof according to the well known law of physics and tends to cause axial expansion of the device T. Since the end plate 42 is in engagement with the stationary end plate 14 and acts as a reaction member, the force of the expanding coolant medium therein tends to urge the end plate 41 in an axial direction away from the end plate 42 to thereby increase the volume or capacity of the chamber 43 in order to compensate for the increase in volume of the coolant medium therein. This force is, in turn, exerted by the end plate 41 against the inner race 22 of the bearing 18a and thus is exerted against the inner races 22 of the bearings 18 in a direction substantially in opposition to the direction of thrust forces imposed thereagainst by the drive shaft 11. The opposition force thus created by the temperature responsive device T tends to reduce the resultant force imposed against the bearings 18 and thus consequently reduces the tendency of the bearings 18 to generate heat. Therefore it can be seen that the greater the hydraulic thrust load forces imposed against the bearings 18, the greater the heat generated thereby, and, subsequently, the greater the opposition forces produced by the temperature responsive device T opposing the thrust load forces to thereby minimize the effects thereof. It can be seen that the temperature responsive device T prevents the tendency of the bearings to heat excessively and subsequently deteriorate. By utilizing the device T, it is not necessary that the bearings 18 be over-sized in order to provide a safety factor in case excessive thrust forces are imposed thereagainst as the device T tends to balance these excessive thrust forces.

If the force of the coolant medium disposed within the chamber 43 of the temperature responsive device T exceeds a predetermined force due to excessive heating and resulting expansion thereof, the predetermined force being determined by the particular compression force set for the spring means 62 of the ball check valve 61, the force of the fluid acting against the ball check valve 61 will cause it to move away from its valve seat 53 and permit a portion of the coolant medium within the chamber 43 to flow to the exterior of the device T into chamber C thereby relieving the excessive force exerted by the device T. This, of course, is a safety feature to prevent harmful effects created by an excessive force imposed by the device T against the bearings 18. After a sufficient portion of the coolant medium within the chamber 43 has escaped to cause a drop in the value of the force of the remaining portion of the coolant within the device T below the value of the opposition force of the spring means 61, the ball check valve 61 will close. Upon the subsequent cooling of the remaining portion of the coolant medium within the device T, the coolant medium displaces a smaller volume of the chamber 43 than that which would be provided if there was the predetermined amount of coolant medium within the chamber 43. Therefore, during this subsequent cooling condition, the bellows 35 and 38 tend to maintain the end plates 41 and 42 in a predetermined spaced relation, however, the reduction in volume of the remaining portion of the coolant medium within the chamber 43 is smaller than the volume of chamber 43 and thus creates a partial vacuum within the chamber 43. This vacuum condition within chamber 43 causes the ball valve 72 to be opened in opposition to the compression force of the spring means 74 and thus permits a portion of the hydraulic fluid within the chamber C to flow through the passage means 48 into the chamber 43. The ball 72 remains open until the vacuum condition is eliminated by the resultant filling of the chamber 43 with the coolant medium from chamber C. When the vacuum condition has been eliminated, the chamber 43 is again sufficiently filled with the desired predetermined amount of coolant medium and the ball check valves 61 and 62 are in their normally closed positions.

Therefore, it can be seen that there has been disclosed a temperature responsive device which is adapted to exert a force in response to the temperature of the device where the maximum force that can be exerted by the device may be adjustably predetermined.

While this invention has been disclosed with certain specific embodiments thereof, it is to be understood that these were by way of example rather than limitation, and it is intended that the invention be defined by the appended claims, which should be given a scope as broad as consistent with the prior art.

What is claimed is:

1. In combination, a housing having a chamber therein; a load element disposed in said chamber; means operatively associated with said load element, said means being adapted to exert load forces on said load element in one direction whereby said load element generates heat in relation to said load forces; coolant means disposed in said chamber, said coolant means being adapted to be circulated through said chamber and absorb the heat generated by said load element; a member having axially spaced opposed ends and being disposed in said chamber, said member being adapted to be expanded and collapsed in only said axial direction whereby said opposed ends are adapted to be positioned in different spaced relations relative to each other, one of said ends being in engagement with said load element and the other of said ends being in engagement with said housing; means defining a cavity within said member and a temperature responsive medium disposed in said cavity whereby said medium is adapted to be responsive to the temperature of said coolant means and tends to effect expansion and collapsing of said member in accordance with that temperature to thereby cause said member to exert forces on said load element in opposition to said load forces and in relation thereto, said forces on said load element thus tending to reduce the effect of said load forces on said load element.

2. In combination, a housing having a chamber therein; a load element disposed in said chamber; means operatively associated with said load element, said means being adapted to exert load forces on said load element in one direction whereby said load element generates heat in relation to said load forces; coolant means disposed in said chamber, said coolant means being adapted to be circulated through said chamber and absorb the heat generated by said load element; a bellows having axially spaced opposed ends and being expanded and collapsed in only said axial direction whereby said opposed ends are adapted to be positioned in different spaced relations relative to each other, one of said ends being in engagement with said load element and the other of said ends being in engagement with said housing; means defining a cavity within said bellows; and a temperature responsive medium disposed in said cavity whereby said medium is adapted to be responsive to the temperature of said coolant means and tend to effect expansion and collapsing of said bellows in accordance with that temperature to thereby cause said member to exert forces on said load element in opposition to said load forces and in relation thereto, said forces on said load element thus tending to reduce the effect of said load forces on said load element.

3. In combination, a housing having a chamber therein; a load element disposed in said chamber; means operatively associated with said load element, said means being adapted to exert load forces on said load element in one direction whereby said load element generates heat in relation to said load forces; coolant means disposed in said chamber, said coolant means being adapted to be circulated through said chamber and absorb the heat generated by said load element; a member having axially spaced opposed ends and being disposed in said chamber, said member being adapted to be expanded and collapsed in only said axial direction whereby said opposed ends are adapted to be positioned in different spaced relations relative to each other, one of said ends being in engagement with said load element and the other of said ends being in engagement with said housing; means defining a cavity within said member; a temperature responsive medium disposed in said cavity whereby said medium is adapted to be responsive to the temperature of said coolant means and tends to effect expansion and collapsing of said member in accordance with that temperature to thereby cause said member to exert forces on said load element in opposition to said load forces and in relation thereto, said forces on said load element thus tending to reduce the effect of said load forces on said load element; means defining passage means in said member, said passage means being adapted to interconnect said cavity with said chamber; one-way valve means disposed in said passage means; and biasing means carried by said valve means tending to maintain said valve means in a closed position to prevent flow from said cavity to said chamber whereby said valve means is adapted to permit said flow when the pressure force of said medium in said chamber exceeds the force of said biasing means thereby regulating the force exerted by said member on said load element.

4. In combination, a housing having a chamber therein; a load element disposed in said chamber; means operatively associated with said load element, said means being adapted to exert load forces on said load element in one direction whereby said load element generates heat in relation to said load forces; coolant means disposed in said chamber, said coolant means being adapted to be circulated through said chamber and absorb the heat generated by said load element; a member having axially spaced opposed ends and being disposed in said chamber, said member being adapted to be expanded and collapsed in only said axial direction whereby said opposed ends are adapted to be positioned in different spaced relations relative to each other, one of said ends being in engagement with said load element and the other of said ends being in engagement with said housing; means defining a cavity within said member; coolant means disposed in said cavity whereby said coolant means is adapted to be responsive to the temperature of said circulated coolant means and tends to effect expansion and collapsing of said member in accordance with that temperature to thereby cause said member to exert forces on said load element in opposition to said load forces and in relation thereto, said load forces on said load element thus tending to reduce the effect of said load forces on said load element; means defining a pair of passage means in said member, said passage means being adapted to interconnect said cavity with said chamber; a first one-way valve means disposed in one of said passage means; and a second one-way valve means disposed in the other of said passage means, said first valve means tending to prevent flow from said cavity to said chamber through said one passage means and said second valve means tending to prevent flow from said chamber to said cavity, said valve means being so constructed and arranged that said first valve means permits a portion of said coolant in said cavity to flow to said chamber when the force of the coolant in said cavity exceeds a predetermined force and said second valve means permits coolant from said chamber to flow into said cavity during certain other conditions of operation.

5. In combination, a housing having a chamber therein; a load element disposed in said chamber; means operatively associated with said load element, said means being adapted to exert load forces on said load element in one direction whereby said load element generates heat in relation to said load forces; coolant means disposed in said chamber, said coolant means being adapted to be circulated through said chamber and absorb the heat generated by said load element; a member having axially spaced opposed ends and being disposed in said chamber, said member being adapted to be expanded and collapsed in only said axial direction whereby said opposed ends are adapted to be positioned in different spaced relations relative to each other, one of said ends being in engagement with said load element and the other of said ends being in engagement with said housing; means defining a cavity within said member; a predetermined quantity of coolant means disposed in said cavity whereby said coolant means is adapted to be responsive to the temperature of said circulating coolant means and tends to effect expansion and collapsing of said member in accordance with that temperature to thereby cause said members to exert forces on said load element in opposition to said load forces and in relation thereto, said forces on said load element thus tending to reduce the effect of said load forces on said load element; means defining a pair of passage means in said member, said passage means being adapted to interconnect said cavity with said chamber; and one-way valve means associated with each of said passage means, said valve means being so constructed and arranged that one of said valve means is adapted to permit a portion of said predetermined quantity of coolant means to flow out of said cavity through one of said passage means into said chamber when the force of said predetermined quantity of coolant means exceeds a predetermined value and the other of said valve means is adapted to permit a flow of coolant means from said chamber through the other of said passage means to said cavity to replace said portion of said predetermined quantity of coolant means under certain other operating conditions.

6. In combination, a housing having a chamber therein; a rotatable shaft carried by said housing and having a portion thereof disposed in said chamber; bearing means disposed about said portion of said shaft and supporting said shaft relative to said housing; means operatively associated with said shaft, said means being adapted to cause said shaft to exert thrust loads on said bearing means in one direction whereby said bearing means generates heat in relation to said thrust loads; coolant means disposed in said chamber, said coolant means being adapted to be circulated through said chamber and absorb the heat generated by said bearing means; a member having axially spaced opposed ends and being disposed about said portion of said shaft, said member being adapted to be expanded and collapsed in only said axial direction whereby said opposed ends are adapted to be positioned in different spaced relations relative to each other, one of said ends being in engagement with said bearing means and the other of said ends being in engagement with said housing; means defining a cavity within said member; and a temperature responsive medium disposed in said cavity whereby said medium is adapted to be responsive to the temperature of said coolant means and tends to effect expansion and collapsing of said member in accordance with that temperature to thereby cause said member to exert forces on said bearing means in opposition to said thrust loads and in relation thereto, said forces on said bearing means thus tending to reduce the effect of said thrust loads on said bearing means.

7. In combination, a housing having a chamber therein; a rotatable shaft carried by said housing and having a portion thereof disposed in said chamber; bearing means disposed about said portion of said shaft and having a first element thereof rotatable with said shaft, a second element thereof fixed relative to said housing and in engagement therewith, and a plurality of third elements disposed between said first and second elements to permit relative rotation therebetween to thereby support said portion of said shaft relative to said housing; means operatively associated with said shaft, said means being adapted to cause said shaft to exert thrust loads on said bearing means in one direction whereby said bearing means generates heat in relation to said thrust loads; coolant means disposed in said chamber, said coolant means being adapted to be circulated through said chamber and absorb the heat generated by said bearing means; a member having axially spaced opposed ends and being disposed about said portion of said shaft, said member being adapted to be expanded and collapsed in only said axial direction whereby said opposed ends are adapted to be positioned in different spaced relations relative to each other, one of said ends being in engagement with said first element of said bearing means and the other of said ends being in engagement with said housing; means defining a cavity within said member; and a temperature responsive medium disposed in said cavity whereby said medium is adapted to be responsive to the temperature of said coolant and tends to effect expansion and collapsing of said member in accordance with that temperature to thereby cause said member to exert forces on said bearing means in opposition to said thrust loads and in relation thereto, said forces on said bearing means thus tending to reduce the effect of said thrust loads on said bearing means.

References Cited in the file of this patent

UNITED STATES PATENTS

| 783,136 | Rice | Feb. 21, 1905 |
| 862,867 | Eggleston | Aug. 6, 1907 |
| 2,032,007 | Fee | Feb. 25, 1936 |
| 2,577,242 | Grad | Dec. 4, 1951 |